Nov. 24, 1959   M. M. ARLIN   2,913,829
GAUGING APPARATUS
Filed March 19, 1956   2 Sheets-Sheet 1
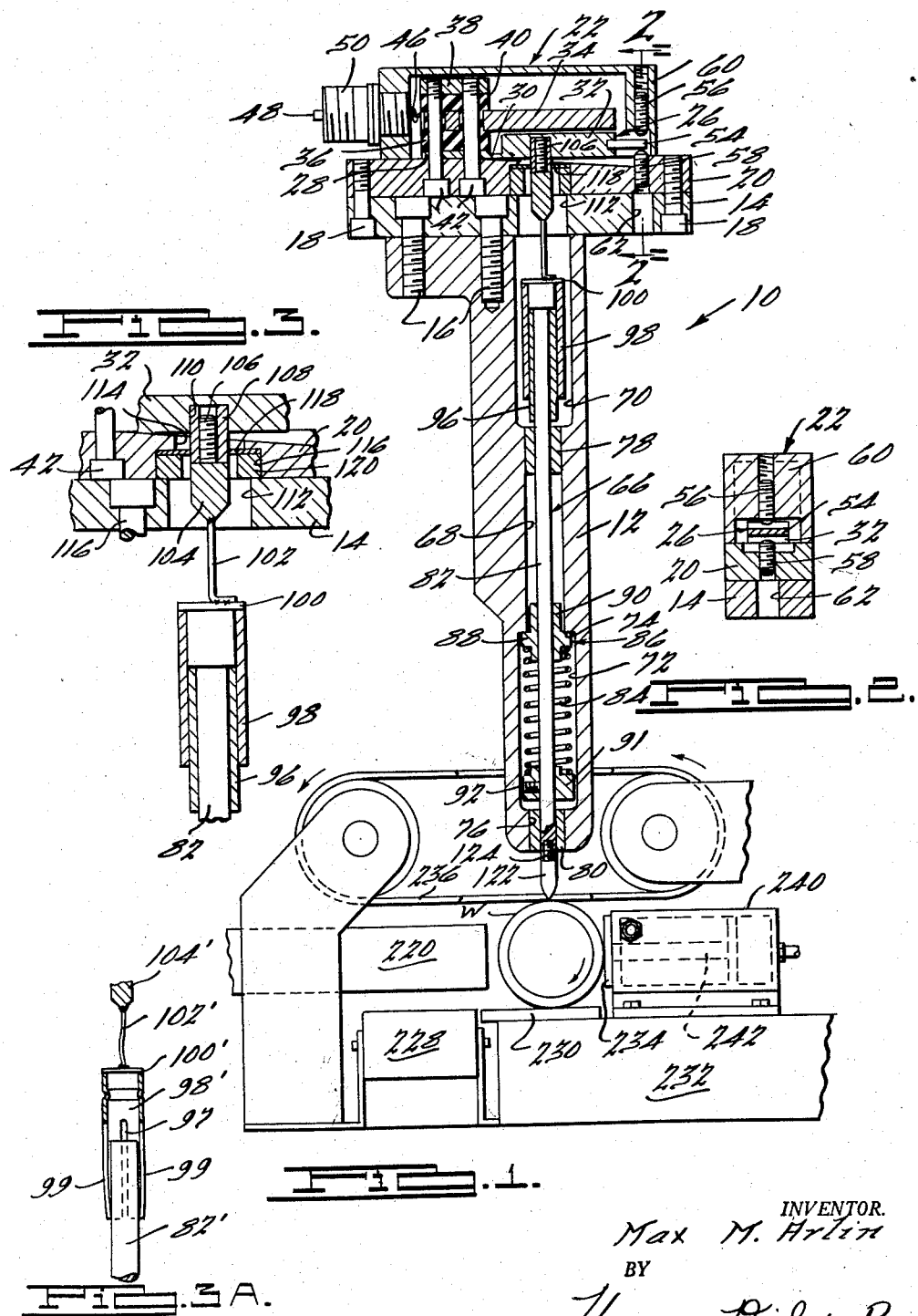
INVENTOR.
Max M. Arlin
BY
Harness, Dickey & Pierce
ATTORNEYS.

Nov. 24, 1959
M. M. ARLIN
2,913,829
GAUGING APPARATUS
Filed March 19, 1956
2 Sheets-Sheet 2
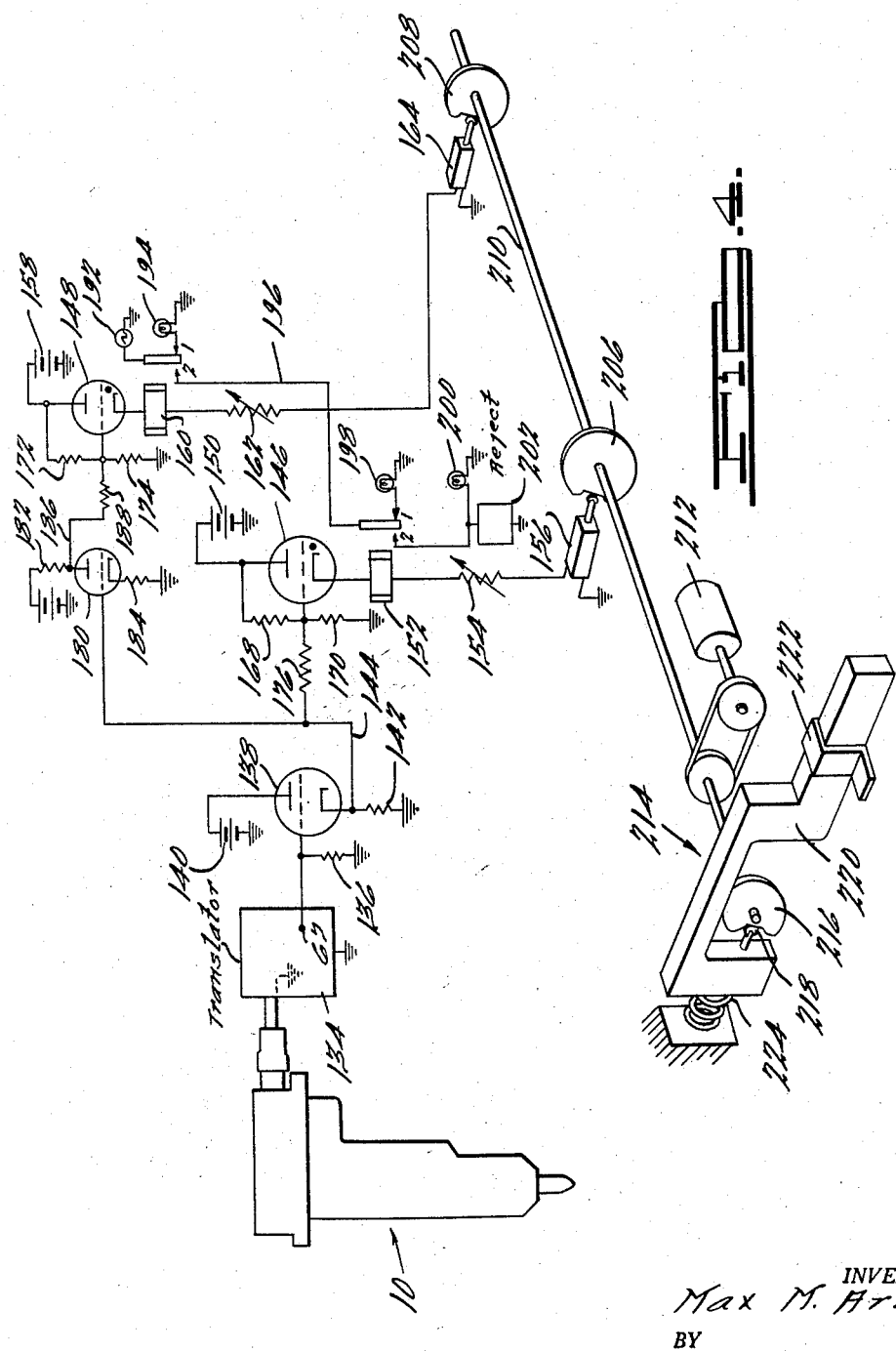
INVENTOR.
Max M. Arlin
BY
Harness, Dickey & Pierce
ATTORNEYS.

United States Patent Office 2,913,829
Patented Nov. 24, 1959

2,913,829

GAUGING APPARATUS

Max M. Arlin, Detroit, Mich., assignor to John D. MacArthur, Chicago, Ill.

Application March 19, 1956, Serial No. 572,243

16 Claims. (Cl. 33—147)

This invention relates to measuring systems and more particularly to systems for detecting and signaling departures of workpieces from standard size or configuration.

In the mensurating apparatus disclosed in my Patent 2,635,748, issued April 21, 1953, and in my continuation-in-part application Serial No. 309,918, filed September 16, 1952, a gauging head is employed in cooperation with means including a high-frequency oscillator to permit extremely precise dimensional measurement. The systems and apparatus there disclosed are primarily adapted for the measurement of static quantities such as an absolute dimension of a workpiece or the extent of departure of a workpiece dimension from a nominal or standard dimension.

Under the principles of the present invention, a system may be devised which is capable of functioning in the noted manner, but which also possesses the capability of measuring the magnitude of the difference or differences between a plurality of dimensions of a workpiece dependently or independently of absolute dimension.

In the disclosed arrangement, the principles of the invention are applied to the determination of the concentricity or eccentricity of a spherical or cylindrical workpiece, to the displaying of an indication of the exact extent of any departure from concentricity and to the actuation of auxiliary signaling or control equipment if the departure from concentricity exceeds any preselected amount. The system may be arranged to operate to substantially any practical degree of accuracy. Apparatus such as that disclosed can operate at production-line rates, measuring, if desired, departures from concentricity of as little as one-millionth of an inch.

In general, a gauge head is employed to sense the size or configuration of a workpiece and to vary the capacitance of a capacitor as a function or the sensed conditions or changes of conditions. The variable capacitor is employed as an element of a system which produces a direct voltage having an amplitude which varies as a function of the variation in capacitance. This output voltage is employed to deflect the needle of a meter calibrated in any suitable units, including that of dimension if desired. The output voltage is also applied to a control system adapted to signal the occurrence of any preselected critical condition such as a variation in dimension or configuration of a workpiece in excess of a selected amount.

The gauging head is adapted to measure either static or dynamic conditions, and, in the latter case, is able to measure variations in configuration independently of absolute dimension. Thus, the degree of eccentricity of each of a series of spherical or cylindrical members may be measured even though their absolute dimensions differ substantially from one another.

In the preferred arrangement, the capability of the head and associated equipment to measure the difference between two dimensions independently of the absolute value of those dimensions is achieved by providing an internal clutch mechanism adapted to permit an automatic adjustment of the gauging head to the work. The automatic adjustment is of such a nature that the highest (or lowest) point on a rotating cylindrical or spherical surface will produce the same output indication, if desired, as the highest (or lowest) point on any other rotating spherical or cylindrical member even though the absolute heights of those points be greatly disparate. Since the movement of one capacitor plate relative to another is essentially arcuate in the preferred arrangement, and since the amplitude of that motion may be substantial, means also are or may be provided for permitting the ready translation of longitudinal motion of the sensing element of the gauge head into rotational motion of the movable capacitor plate.

The detailed nature of the invention, and the objects and features thereof, may be understood from the following detailed description of an embodiment of the invention when read with reference to the accompanying drawings in which:

Figure 1 is a side elevational view of a gauge head assembly and of a mechanism for appropriately moving a workpiece, the gauge head assembly being represented in section;

Fig. 2 is a vertical sectional view taken substantially along the line 2—2 of Fig. 1;

Fig. 3 is an enlarged view of a portion of the gauge head assembly of Fig. 1;

Fig. 3A is a fragmentary view of a modified form of a portion of the gauge head assembly, certain of the relationships being exaggerated for clarity; and Fig. 4 is a schematic representation of an electrical translating and control system and a mechanical timing and workpiece-control apparatus suitable for association with the equipment of Fig. 1.

Considering first the gauging head assembly represented in Figs. 1–3 of the drawings, in the representatively disclosed arrangement, the gauging head assembly 10 comprises a tubular body portion 12 surmounted by and secured to a lower supporting plate 14 by means such as machine screws 16. Machine screws 18 secure the lower support plate 14 to an upper support plate 20 and a hollow cover 22 surmounts and is removably secured to the upper support plate 20 in any appropriate fashion.

A variable capacitor assembly is disposed within the cavity defined by the hollow cover 22 and the upper surface of the upper support plate 20. The capacitor assembly comprises a lower capacitor plate 26 having a rear or clamping portion 28, an intermediate, reduced cross-section, hinging portion 30 and a forward, massive, electrode portion 32. The lower capacitor plate 26 is preferably formed to the disclosed configuration from a single plate of stock material, so that the hinging portion 30 is fully integral with both the clamping portion 28 and the electrode portion 32. The thickness of the hinging portion 30 is selected in the light of amplitude of rotational motion required of the electrode portion 32 and of the forces capable of being exerted by the sensing mechanism to be described.

An upper capacitor plate 34 is disposed in spaced proximity to the lower capacitor plate 26, the spacing between the left-hand or clamping portion of the upper plate 34 and the clamping portion 28 of the lower plate 26 being established by a spacer 36 of insulating material. A top plate 38 surmounts the capacitor assembly stack, being separated from the upper capacitor plate 34 by an insulating member 40. The entire stack is clamped by means of machine screws 42 passing through apertures in the upper support plate 20, in the clamping portion 28 of the lower capacitor plate 26, in insulating spacer 36, in upper capacitor plate 34, and in insulator 40, and engaging tapped blind bores in the top plate 38. It will be noted that the upper capacitor plate 34 is insulated from the machine screws 42 by appropriate means such as insulating sleeves inserted in the screw-accepting apertures therein.

The upper capacitor electrode 34 is electrically connected, by means of wire 46, to the insulated central pin 48 of a coaxial plug assembly 50, the case of the plug 50 being electrically integral with the cover 22 and hence with the upper support plate 20 and the lower capacitor plate 26. Plug assembly 50 is adapted to accept a socket associated with a coaxial transmission line.

Lower capacitor plate 26 is shown to be approximately centered in the total arc of motion of that plate. In that approximately mid position, it has been found to be preferable that the lower plate 26 be approximately parallel to the upper plate 34, being nonparallel with the upper plate both when forced into a position closer to the upper plate and when rotated to a position further from the upper plate 34. To establish limits to the amplitude of arcuate motion of the lower capacitor plate 26 in either direction, a projecting arm 54 (Figs. 1 and 2) is secured to the portion 32 of the lower capacitor plate 26 such as by drive-fitting it in a slot in the edge of that plate. The remote end of projecting arm 54 is disposed between a pair of adjusting screws 56 and 58, the former of which threadedly engages a tapped vertical aperture in the wall 60 of the cover 22, and the latter of which threadedly engages a tapped aperture in the upper support plate 20, an aperture 62 being formed in the lower support plate 14 in alignment with the tapped aperture in the upper support plate 20. The end of each of the adjusting screws 56 and 58 which engages the projecting arm 54 is representatively hemispherical and the other end of each of those screws is provided with a socket or slot to permit engagement by an appropriate tool for adusting purposes.

Rotational motion is imparted to the lower capacitor plate 32 by an actuating rod assembly 66 the major portion of which is disposed within the central bore of the tubular body portion 12 (Fig. 1). The central bore in the tubular body 12 comprises a central bore portion 68 disposed between enlarged bore portions 70 and 72, the reduction in bore diameter between the portions 68 and 72 defining a shoulder or seat 74. At the lower end of the tubular body 12 the bore portion 76 is representative of approximately the same diameter as the central bore portion 68.

A bushing 78 is drive-fitted at the upper end of the centrol bore portion 68 and a bushing 80 is drive-fitted in the bore portion 76, bushings 78 and 80 serving to guide the slideable actuating rod 82. The inner diameters of the bushings 78 and 80 should be so related to the actuating rod 82 that the latter may slide relatively freely but be prevented from any motion transversely of its longitudinal axis relative to the body 12. The bushings 78 and 80 should also be designed to prevent, so far as possible, the ingress of foreign particles into the gauge head mechanism.

Actuating rod 82 is biased downwardly by a compression spring 84 engaging a keeper 86. Keeper 86 includes a flange portion 88 adapted to engage the shoulder 74 and a neck portion 90 guided in the lower end of the intermediate bore portion 68. The lower end of compression spring 84 engages the upper surface of a collar 91 secured in position upon the actuating rod 82 by means such as a set screw 92.

A sleeve 96 is rigidly secured at the upper end of the actuating rod 82. As shown, sleeve 96 is of substantial length so that its lower end extends to a point in variable proximity to the bushing 78. In the preferred arrangement, engagement between the lower end of the sleeve 96 and the upper surface of the bushing 78 constitutes a limit stop to the downward motion of the actuating rod 82, that is, the distance between the lower end of the sleeve 96 and the upper surface of the bushing 78 is, under all circumstances, less than the distance between the collar 91 and the bushing 80. Sleeve 96 telescopes within an outer sleeve 98, the upper end of which is closed by a sleeve cap 100 drive-fitted therein or otherwise secured thereto, as may best be seen in the enlarged view of Fig. 3 of the drawings. A vertically extending flexible connecting rod 102 is welded or otherwise secured to the upper surface of the sleeve cap 100, with the upper end of rod 102 being welded or otherwise secured to a connector 104.

Connector 104 is fixed to the lower, movable capacitor plate 26 in any suitable fashion. In the disclosed arrangement, connector 104 is provided with an upwardly extending integral threaded portion 106 adapted to engage the tapped internal bore in a sleeve 108 (Fig. 3) force fitted or otherwise secured in a counterbore 110 in the capacitor plate 32. The assembly including connector 104 passes through aligned clearance holes 112 and 114 in the lower and upper supporting plates 14 and 20, respectively. Aperture 114 is counterbored to define a socket 116 in which is seated a resilient seal member 118 which is centrally apertured to accept the sleeve 110 and/or the connector 104. Seal 118 is secured in position by a retaining ring 120. It will be noted that seal 118 must be sufficiently resilient to permit the connector 104 and the sleeve 110 to move over an arcuate path about the hinge 30 (Fig. 1). Since connector 104 does move in an arcuate path and since actuating rod 82 and hence sleeves 96 and 98 move only in translation relative to the body portion 12, connecting rod or wire 102 must be capable of deflecting adequately to convert the translational motion of the sleeve 98 into rotational motion of the connector 104, but must not be so flexible that it is incapable of properly operating in tension or compression to transmit the forces from the sleeve 98 to the connector 104.

At its lower end, actuating rod 82 terminates in a sensing tip 122 removably secured thereto in any appropriate fashion such as by means of an extended threaded portion 124 engaging a tapped aperture in the actuating rod 82. Sensing tip 122 is preferably hardened and may be of any suitable configuration depending upon the nature of the workpiece W which it is to engage. In the shown arrangement, sensing tip 122 is generally conoidal, terminating in a small-radius end.

In the schematic representation of Fig. 1, workpiece W is shown as having a circular cylindrical surface, and as being rotatable about its longitudinal axis in a manner to be described. During the rotation of the workpiece W, sensing tip 122 will follow the surface configuration, under the biasing force of spring 84, and will be moved in vertical translation relative to the tubular body 12 as a function of the change of the distance between the rotational axis of the workpiece W and the point on the surface engaged by sensing tip 122, a change which will occur only if workpiece W is eccentric. Obviously, under any static condition or at any instant of time, the position of sensing tip 122 and hence of actuating rod 82 will reflect an absolute dimension between the sensing tip and the longitudinal axis of the workpiece W.

The friction clutch mechanism including the telescoping sleeves 96 and 98 is adapted to permit, under appropriate circumstances, movement of the actuating rod 82 and of the sensing tip 122 independently of motion of the lower capacitor plate 26. The degree of frictional engagement between the outer surface of sleeve 96 and the inner surface of sleeve 98 is sufficient so that no slipping will occur during the transmission of forces from the actuating rod 82 to rotate the lower capacitor plate 26 so long as that capacitor plate is free to rotate. However, upwardly directed forces continuing to act upon the sensing tip 122 after the projecting arm 54 of the lower capacitor plate 26 has engaged the upper adjusting screw 56 will, if adequate in amplitude, cause the inner sleeve 96 to slide further within the outer sleeve 98. Conversely, if projecting arm 54 becomes engaged with the lower adjusting screw 58 prior to the point at which the lower end of the inner sleeve 96 reaches abutment with the bushing 78, then compression spring 84 will continue to force actuating rod 82 downwardly until that engagement occurs, assuming the motion not to be stopped by the engagement of the sensing tip 122 with any workpiece, sliding the inner sleeve 96 a distance within but outwardly from the outer sleeve 98.

The friction clutch comprising sleeves 96 and 98 may be employed in conjunction with adjusting screws 56 and 58 to provide an initial adjustment of the gauging head so that the projecting arm 54 of the lower capacitor plate 26 is intermediate the adjusting screws 56 and 58 when the sensing tip 122 is in engagement with the surface of a workpiece of the correct size. In this arrangement, two workpieces oversize and undersize by equal amounts will produce equal angles of movement of the lower capacitor plate 26 from its normal, centered position.

The friction clutch may also be employed to permit an automatic adjustment of the gauging head to each individual workpiece where the information desired is that of changes or differences in dimensions. As one mode of utilization, the lower adjusting screw 58 may be so positioned that projecting arm 54 will engage that screw, during downward motion of the actuating rod 82, at a point prior to that at which the lower end of the inner sleeve 96 strikes the bushing 78, so that each time a workpiece is removed, actuating rod 82 will continue to move downwardly, under the impetus of spring 84, after the motion of the lower capacitor plate 26 has been terminated by the engagement of arm 54 with screw 58, until the inner sleeve 96 strikes the bushing 78, the inner sleeve 96 sliding within the outer sleeve 98 in the process. The position of the gauging head with respect to the longitudinal axis of the workpiece W and the position of the adjusting screw 56 may then be selected, both with regard to the nominal size of the workpiece and the expected amplitude of variation of size or from concentricity, so that any workpiece, at least when rotated, will force the actuating rod 82 upwardly sufficiently so that not only will projecting arm 54 strike screw 56 but also so that inner sleeve 96 will be forced to slip a distance within the outer sleeve 98. Thus, every workpiece, regardless of its diameter will drive projecting arm 54 into engagement with adjusting screw 56 at the point of maximum dimension during its rotation. If the workpiece is eccentric, the actuating rod 82 will move downwardly during the course of the rotation of the workpiece, moving the lower capacitor plate 26 away from the upper capacitor plate 34 by an angle which varies as a function of the amount of eccentricity of the workpiece. In this arrangement, the amplitude of the angle through which lower capacitor plate 26 moves will reflect the difference between the greatest and the least radius of the eccentric workpiece being checked independently of the extent of departure of the total size of that workpiece from the nominal diameter. Thus, the gauging head may be adapted to be used either to measure true dimensions or changes or differences in dimension independently of absolute values.

It will be appreciated that the gauge head may be used in manners other than that delineated, and that the upward and downward movements described are but representative, neither the orientation of the gauge head nor the direction of movement of the actuating rod being necessarily restricted to the described arrangement. Thus, the sensing end of the actuating rod may be moved by a workpiece to drive the movable capacitor plate to either of its limit positions at the point on the workpiece engaged by that end which is most distant or least distant from some reference line or plane, or, otherwise stated, the reference line or plane may be either above or below (or intersecting) the workpiece.

The modified arrangement represented in Fig. 3A of the drawings differs in the details of the friction clutch and in the method of assembly of the elements of the clutch and further serves to illustrate a functional method of assembly. The arrangement of Fig. 3A is, in a number of aspects, preferred over the structure of Fig. 3.

In the showing of Fig. 3A, the actuating rod 82' is itself employed as one element of the friction clutch, although a separate sleeve, correlative of sleeve 96 of Fig. 3, may be provided if desired. In the absence of a sleeve 96, any appropriate pair of engageable elements may be selected to serve as a limit stop to downward motion of the actuating rod 82' such as a shoulder on that rod engaging bushing 78 (Fig. 1) or the collar 91 may be permitted to engage the bushing 80 to fill this function.

The upper end of actuating rod 82' is slidably disposed within a clutch sleeve 98' provided with a plurality (representatively four) of longitudinal slots 97 spaced around the periphery of the sleeve and extending a major portion of the length of the sleeve. Slots 97 serve to define a plurality of springable fingers 99. While the fingers 99 may engage rod 82' over their entire length, it has been found to be advantageous to have the fingers 99 engage the rod 82' only near their ends. In practice, this may be accomplished by constructing the sleeve 98' with an internal diameter slightly greater than the outer diameter of rod 82', by a difference, for example, of two thousandths of an inch. A thin shim is then placed around the upper end of rod 82' prior to assembly, the shim having a thickness of, for example, one thousandth of an inch. The rod 82' is then inserted into the sleeve 98' roughly to the shown extent or more. Forces are then exerted to bend the tip ends of the fingers 99 into engagement with the rod 82', sufficient force being exerted to produce the requisite frictional engagement. The rod 82' is then (or at a later time, as will be noted) withdrawn from the sleeve 98' so that the constructional shim may be removed. When replaced, the rod 82' will be engaged only by the tips of the fingers 99.

It is also contemplated that the elements 98', 100', 102' and 104' may be functionally located to insure proper positioning despite variations in those parts. Thus, with rod 82' accurately disposed within sleeve 98' (either prior to or after removal of the constructional shim), the position of sleeve 98' is fixed (transversely of its longitudinal axis) since the position of rod 82' is fixed by its bearings. The flexible connecting rod 102' is secured to the disk-like sleeve cap 100' and to the connector 104' in any suitable manner, silver soldering being desirable. The transverse location of connector 104' is fixed by its connection to capacitor plate 26, and consequently the transverse location of cap 100' is also fixed for any free position of flexible rod 102'. Depending upon the free configuration of rod 102', sleeve cap 100' may or may not be accurately centered on sleeve 98'. If desired, the flexible rod 102' may at this point be deflected, taking a permanent set, to secure at least an approximate alignment between the cap 100' and the sleeve 98'. The elements 98' and 100' are then joined together, care being exercised not to displace either element from its previous free position. A low-temperature solder has been successfully employed to secure these elements together without disturbing the joint between rod 102' and cap 100'. In this manner, the elements are precisely positioned in their appropriate functional transverse locations.

The gauging head represented in Figs. 1–3A of the drawings may be associated with any suitable equipment capable of producing an output indication which varies as a function of the change in capacity of the capacitor including plates 26 and 34. One suitable apparatus is disclosed in Fig. 1 of my copending application Serial No. 309,918, filed September 16, 1952 as a continuation-in part of certain applications therein identified. In that apparatus, the output is a direct voltage which varies as a function of the capacity of the gauging head, that voltage being there applied across a meter which may be calibrated in any appropriate units. Such a system is represented by the rectangle 134 in Fig. 4 of the drawings. The output direct voltage from apparatus 134, appearing at terminal 67 therein (identically identified in the showing of Fig. 1 of the aforesaid application), may also be employed to actuate a signaling or control mechanism of the type disclosed in Fig. 4 of the drawings.

The output voltage of the translator 134, appearing at terminal 67, may be made to vary as any appropriate function of the relative position of the capacitor plates 26 and 34 of the gauging head assembly. In one purely representative but suitable arrangement, a low direct voltage, approaching zero volts, may be produced at terminal 67 when the capacitor plates 26 and 34 are most nearly in their closed positions while a higher direct voltage, approaching, for example, 100 volts, may be produced at terminal 67 when capacitor plate 26 is separated from capacitor plate 34 by a maximum amount. Thus, in static measurements of absolute dimension, a nominal sized workpiece would produce a mid-range direct voltage, an oversized workpiece would produce a reduced output direct voltage, and an undersized workpiece would result in the production of a direct voltage in excess of the mid-range value at the output terminal 67. Similarly, in the measuring of eccentricity, the highest point along the sensed circumference of the workpiece would produce a direct voltage at terminal 67 of a minimum value, zero volts as an example, while the lowest point on an eccentric workpiece would produce a higher voltage (assuming positive polarity) at terminal 67, the difference between these voltages varying as a function of the difference in dimension between the highest and lowest points of the workpiece being tested.

The voltage between terminal 67 and ground is applied across grid return resistor 136 to the input circuit of vacuum tube 138. Tube 138 is connected as a cathode follower by virtue of the direct connection of its anode to a low-impedance direct voltage source 140 and the connection of its cathode to ground through a load resistor 142. While the plate-voltage supply for tube 138, and for other tubes in the system, has been represented as a battery for convenience and clarity, it will be appreciated that any suitable source may be employed, such as any conventional form of alternating current rectifying and filtering system.

The resultant positive direct voltage appearing between conductor 144 and ground is employed to control the operation of a pair of heated-cathode gaseous discharge devices or thyratrons 146 and 148. Both thyratrons 146 and 148 are assumed to be of the type requiring a substantial positive grid-to-cathode voltage as a condition precedent to initial discharge or firing. The plate circuit of thyratron 146 includes source of potential 150, the winding of relay 152, variable resistor 154 and a pair of electrical contacts in limit switch 156. The plate circuit of thyratron 148 is similar, including a source of potential 158, the winding of relay 160, variable resistor 162 and limit switch 164.

To provide a positive bias for the thyratrons of a value less than that necessary to initiate discharge in the thyratrons, a voltage divider comprising resistors 168 and 170 is connected between the source of potential 150 and ground, the control grid of thyratron 146 being connected to the point of junction of resistors 168 and 170, and a voltage divider comprising resistors 172 and 174 is connected between the voltage supply 158 and ground, the control grid of thyratron 148 being connected to the point of junction of resistors 172 and 174.

The positive voltage existing between conductor 144 and ground is applied across a voltage divider comprising resistors 176 and 170, resistor 176 serving primarily a blocking function. Consequently, the voltage across resistor 170 and at the control grid of thyratron 146 is equal to the sum of these biasing and signaling voltages. Assuming the contacts of limit switch 156 to be closed, plate current will flow through thyratron 146 if the amplitude of the applied signal voltage exceeds a pre-selected minimum value, and that plate current will be adequate to operate relay 152 if that signal-voltage amplitude is adequately great, as established by the setting of current limiting resistor 154. Hence, relay 152 will be operated if the voltage at terminal 67 rises to a sufficiently high positive value.

The voltage on conductor 144 is also applied to the control grid of vacuum tube 180, the plate circuit of which includes a load resistor 182 and a self-biasing resistor 184. The function of tube 180 is to invert or reverse the direction of change of amplitude of the voltage between conductor 144 and ground. The voltage between conductor 186 and ground, though always positive, will change in value as an inverse function of the changes in amplitude of the voltage between conductor 144 and ground. This voltage between conductor 186 and ground is applied across a voltage dividing network comprising resistors 188 and 174, producing a signal-voltage component across resistor 174. Thus, if the voltage between terminal 67 and ground falls to a sufficiently low value, producing a sufficiently high signal-voltage drop across resistor 174, thyratron 148 will be discharged and the plate current flow therethrough will be adequate to operate relay 160.

In static measuring of absolute dimensions, therefore, under the foregoing assumptions, relay 152 will be operated if the sensed workpiece is undersize by an amount equal to or in excess of a preselected amount and relay 160 will be operated if the workpiece is oversize by an amount equal to or in excess of a preselected amount.

In the dynamic measurement of dimensional differences such as in the determination of the extent of eccentricity of a rotating workpiece, it is convenient, as before mentioned, to adjust the gauging head assembly so that the movable capacitor plate reaches a position of minimum spacing from the fixed capacitor plate at some point in the rotation of every workpiece, regardless of the absolute dimension of that workpiece. If this arrangement be employed, then the circuit parameters should be so selected and resistor 162 so adjusted that relay 160 will be operated during the checking of each workpiece regardless of its concentricity or degree of eccentricity. Resistor 154 is then adjusted so that relay 152 will be operated only if the rotating workpiece is eccentric by an amount equal to or in excess of a preselected amount.

Relays 152 and 160 may be employed as the elements of any suitable indicating or control system. In the disclosed arrangement, when relay 160 is released, a source of power 192 is applied through the No. 1 contact of that relay to energize signal lamp 194. Upon the operation of relay 160, the No. 1 contact thereof is opened to extinguish signal lamp 194, but a circuit is completed through the No. 2 contact of relay 160, conductor 196, through the No. 1 contact of relay 152 (assuming relay 152 to be released) and through the filament of signal lamp 198 to energize that signal lamp. Upon the subsequent operation of relay 152, lamp 198 is extingiushed but the voltage on conductor 196 is communicated through the No. 2 contact of relay 152 to energize a signal lamp 200 as well as to operate a control mechanism 202 which may, representatively, constitute a reject mechanism for producing the discard of the tested workpiece. Other control arrangements will be apparent to those skilled in the art.

In order that thyratrons 146 and 148 may be extinguished at the completion of the testing of each workpiece, limit switches 156 and 164 are included in their plate circuits as previously noted. Limit switch 156 is controlled by a cam 206 and limit switch 164 is controlled by a cam 208, both of those cams being mounted upon a shaft 210 rotated by a motor 212. The rotation of shaft 210 also controls the functioning of a feed mechanism 214 including a cam 216, and a cam follower 218 mounted on a feed arm 220, feed arm 220 being slidably supported in a guide 222 and biased by a spring 224 so that cam follower 218 remains in engagement with cam 216. As will be seen, a workpiece is fed to the test location at each complete rotation of shaft 210. The several cams are so keyed to shaft 210 that while the workpiece is being moved into the work location, the actuating finger of limit switch 156 will be in engagement with the recessed portion of cam 206 and that of limit switch 164 will be in engagement with the recessed portion of cam 208. In this position, both limit switches 156 and 164 open their contacts to interrupt the plate circuits of thyratrons 146 and 148, thereby extinguishing the discharge, if one existed, in those tubes. After the workpiece is inserted in location and the arm 220 has retracted or at least commenced to retract as a result of rotation of shaft 210, the actuating fingers of limit switches 156 and 164 will be cammed to a position in which their contacts are closed and remain closed for the major portion of the succeeding revolution of shaft 210.

As is shown in Fig. 1 of the drawings, feeder arm 220 is disposed adjacent a conveyor belt 228 driven in any suitable fashion and adapted to carry both the checked and the unchecked workpieces. In the schematic showing, it is assumed that the successive workpieces are disposed upon belt 228 with their longitudinal axes parallel with the line of motion of the belt, any suitable means being provided for preventing the workpieces from rolling off the belt. As an unchecked workpiece W arrives at a point adjacent the work area, feeder arm 220 is actuated to move the workpiece laterally from belt 228 to an accurately ground work surface 230 supported upon base 232 and against an accurately positioned side plate 234. In this position, the workpiece W is engaged by a belt 236 which is driven in a direction not only to rotate workpiece W about its longitudinal axis but also to tend to hold the workpiece against plate 234. Plate 234 is located so that the longitudinal axis of actuating rod 82 intersects the longitudinal axis of the workpiece W.

During the checking period feeder arm 220 is retracted to a position where it does not overlie belt 228. At the completion of testing, workpiece W is returned to conveyor belt 228 by means such as pneumatic or hydraulic kick-off cylinder 240, the piston rod 242 of which is integral with the plate 234. If the workpiece is not within the established tolerances, it may be manually removed or the reject mechanism 202 (Fig. 4) may be connected so as automatically to move the workpiece to the reject location. As one example, the reject mechanism 202 may comprise a cylinder similar to and adjacent cylinder 240, effective to drive the workpiece across the belt 228 to a position where it may roll or drop into a reject bin, all in a manner within the capabilities of those skilled in the art to which this invention relates.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In a system for measuring the difference between two dimensions of a workpiece, a movable element, actuating means engageable with a workpiece, a slip clutch interconnecting said element and said actuating means, and means including said actuating means and said slip clutch for automatically moving said element to a preselected reference position for each workpiece independently of the absolute dimensions of said workpiece.

2. In a system for measuring the difference between two dimensions of a workpiece, a movable element, actuating means engageable with a workpiece, a slip clutch interconnecting said element and said actuating means, means including said actuating means and said slip clutch for automatically moving said element to a preselected reference position for each workpiece independently of the absolute dimensions of said workpiece, and means including said actuating means and said slip clutch for moving said element from said reference position a distance determined by the difference between two absolute dimensions of the workpiece.

3. In a system for measuring the difference between two dimensions of a workpiece, a movable element, actuating means engageable with a workpiece, a slip clutch interconnecting said element and said actuating means, means including said actuating means and said slip clutch for automatically moving said element to a first preselected reference position for each workpiece independently of the absolute dimensions of said workpiece, means including said actuating means and said slip clutch for moving said element from said reference position a distance determined by the difference between two absolute dimensions of the workpiece, and means including said slip clutch for moving said element to a second preselected reference position whenever said actuating means is disengaged from a workpiece.

4. In a system for measuring the degree of eccentricity of rotatable workpieces having generally circular cross sections, a movable element having limit positions to movement in each of two directions, actuating means engageable with a line on the surface of each workpiece as the workpiece is rotated relative to a reference plane, a slip clutch interconnecting said element and said actuating means, means including said actuating means and said slip clutch for moving said element to one of said limit positions at the point on said line which is most distant from said reference plane independently of the absolute value of that distance, said slip clutch slipping after said element attains said limit position to effect a change of the relative positions of said actuating means and said element, and means including said actuating means and said slip clutch for moving said element to the other of said limit positions whenever said actuating means is disengaged from a workpiece, said slip clutch maintaining said actuating means and said element in said changed relative positions during said movement of said element between said limit positions.

5. In a system for measuring the degree of eccentricity of rotatable workpieces having generally circular cross sections, a movable element having a limit position to movement in one direction, actuating means engageable with a line on the surface of each workpiece as the workpiece is rotated relative a to reference plane, a slip clutch interconnecting said element and said actuating means, means including said actuating means and said slip clutch for moving said element to said limit position at the point on said line which is most distant from said reference plane independently of the absolute value of that distance, said slip clutch slipping after said element attains said limit position to effect a change of the relative positions of said actuating means and said element, and means including said actuating means and said slip clutch for moving said element from said limit position a distance determined by the change in distance between said point and said reference plane and between successive points on said line and said reference plane, said slip clutch maintaining said actuating means and said element in said changed relative positions during said movement of said element between said limit positions.

6. In a system for measuring the degree of eccentricity of rotatable workpieces having generally circular cross sections, a first capacitor plate, a movable capacitor plate disposed adjacent said first capacitor plate having a limit position to movement in one direction, actuating means for moving said movable capacitor plate and engageable with a line on the surface of each workpiece as the workpiece is rotated relative to a reference plane, and means including said actuating means for moving said movable plate to said limit position at the point on said line which is most distant from said reference plane independently of the absolute value of that distance.

7. In a system for measuring the degree of eccentricity of rotatable workpieces having generally circular cross sections, a first capacitor plate, a movable capacitor plate disposed adjacent said first capacitor plate having a limit position to movement in one direction, actuating means for moving said capacitor plate and engageable with a line on the surface of each workpiece as the workpiece is rotated relative to a reference plane, means including said actuating means for moving said movable plate to said limit position at the point on said line which is most distant from said reference plane independently of the absolute value of that distance, translating means for converting changes in the relative positions of said plates into a signal some characteristic of which changes with said changes in the relative position of said plates, and control means controlled by said translating means.

8. In a system for measuring the degree of eccentricity of rotatable workpieces having generally circular cross sections, a first capacitor plate, a movable capacitor plate disposed adjacent said first capacitor plate having a limit position to movement in one direction, actuating means for moving said movable capacitor plate and engageable with a line on the surface of each workpiece as the workpiece is rotated relative to a reference plane, means including said actuating means for moving said movable plate to said limit position at the point on said line which is most distant from said reference plane independently of the absolute value of that distance, translating means for converting changes in the relative positions of said plates into a signal the magnitude of which changes with said changes in the relative position of said plates, control means, and means effective if the change of magnitude of said signal exceeds a preselected amount for actuating said control means.

9. In a system for measuring the change of position of a sensing element, a support member, a variable element, means pivotally mounting said variable element relative to said support member, an actuating member connected to the sensing element, means supporting said actuating member for translational motion relative to said support member, and means including a deflectable wire interconnecting said variable element and said actuating member, all force transmitted from said actuating member to said variable element being transmitted through said wire.

10. In a system for measuring the change of position of a sensing element, a support member, a first capacitor plate, a second capacitor plate disposed in spaced proximity to said first plate, means supporting said second plate for rotational motion relative to said support member and relative to said first plate, an actuating member connected to the sensing element, means supporting said actuating member for translational motion relative to said support member and relative to said second plate, and deflectable means moved by said actuating member for moving said second plate.

11. In a system for measuring the change of position of a sensing element, a support member, a first capacitor plate, a second capacitor plate disposed in spaced proximity to said first plate, means supporting said second plate for rotational motion relative to said support member and relative to said first plate, an actuating member connected to the sensing element, means supporting said actuating member for translational motion relative to said support member and relative to said second plate, and deflectable means moved by said actuating member for moving said second plate comprising a wire, means securing said wire to said second plate, and means securing said wire to said actuating member.

12. In a system for measuring the position of a surface of an article, a movable element, a sensing device engageable with the surface of the article, and means including a friction clutch interconnecting said element and said device, said friction clutch comprising a tubular member and a rod frictionally and slidably disposed within said tubular member, said tubular member and said rod being movable to a plurality of different relative positions and being capable of transmitting forces from one to the other in each of said positions.

13. In a system for measuring the position of a surface of an article, a movable element, a sensing device engageable with the surface of the article, and means including a friction clutch interconnecting said element and said device, said friction clutch comprising a tubular member having a plurality of effectively independent spring fingers and a rod slidably disposed within said tubular member and engageable with said fingers.

14. In a system for measuring the position of a surface of an article, a movable element, a sensing device engageable with the surface of the article, and means including a friction clutch interconnecting said element and said device, said friction clutch comprising a tubular member having a plurality of effectively independent spring fingers and a rod slidably disposed within said tubular member, the ends of said fingers engaging said rod and the remaining portions of said fingers being spaced from said rod.

15. A resettable gauging mechanism comprising a movable gauging element, a sensing element, and slip clutch means for transmitting forces from one to the other of said elements comprising two frictionally engaged members coupled to said elements, said members being movable with respect to one another to a plurality of different positions, said slip clutch means being capable of transmitting forces between said members in either of two directions in each of said positions.

16. A resettable gauging mechanism comprising a movable gauging element, a sensing element, means for moving one of said elements, means for limiting the extent of movement of the other one of said elements in one direction, and slip clutch means for transmitting forces from one to the other of said elements comprising two frictionally engaged members coupled to said elements, said members being movable with respect to one another from a first to a second position in response to movement of said one of said elements while movement of the other one of said elements in one direction is limited, said slip clutch means being capable of transmitting forces between said members in either of two directions in each of said positions.

References Cited in the file of this patent

UNITED STATES PATENTS

| | | |
|---|---|---|
| 1,617,485 | Hughes | Feb. 15, 1927 |
| 2,099,930 | Emery | Nov. 23, 1937 |
| 2,226,756 | Emery | Dec. 31, 1940 |
| 2,445,455 | Rights et al. | July 20, 1948 |
| 2,514,847 | Coroniti et al. | July 11, 1950 |
| 2,531,317 | Baney et al. | Nov. 21, 1950 |
| 2,635,748 | Arlin | Apr. 21, 1953 |
| 2,715,165 | Matter et al. | Aug. 9, 1955 |